United States Patent [19]
Shoji

[11] Patent Number: 5,850,570
[45] Date of Patent: Dec. 15, 1998

[54] COMMUNICATION APPARATUS FOR PERFORMING DATA TRANSFER UTILIZING DIRECT MEMORY ACCESS CONTROLLER

[75] Inventor: Fumio Shoji, Kawasaki, Japan

[73] Assignee: Canon Kabushiki Kaisha, Tokyo, Japan

[21] Appl. No.: 642,675

[22] Filed: May 3, 1996

[30] Foreign Application Priority Data

May 10, 1995 [JP] Japan .................................. 7-111973

[51] Int. Cl.$^6$ .................................................. G06F 13/12
[52] U.S. Cl. ........................ 395/344; 395/844; 395/837; 395/838; 395/839; 395/858; 395/872
[58] Field of Search .................................... 395/821, 825, 395/826, 827, 835–839, 842–848, 888, 872–877

[56] References Cited

U.S. PATENT DOCUMENTS

| | | | |
|---|---|---|---|
| 5,193,169 | 3/1993 | Ishikawa | 395/842 |
| 5,325,489 | 6/1994 | Mitsuhira et al. | 395/842 |
| 5,481,756 | 1/1996 | Kanno | 395/842 |
| 5,497,501 | 3/1996 | Kohzono et al. | 395/849 |
| 5,561,816 | 10/1996 | Mitxuhira et al. | 395/842 |
| 5,594,923 | 1/1997 | Inoue et al. | 395/842 |
| 5,613,162 | 3/1997 | Kabenjian | 395/842 |
| 5,623,606 | 4/1997 | Yokoyama et al. | 395/200.62 |
| 5,623,622 | 4/1997 | Yuki et al. | 711/100 |
| 5,664,116 | 9/1997 | Gaytan et al. | 395/200.64 |
| 5,696,989 | 12/1997 | Miura et al. | 395/844 |
| 5,768,621 | 1/1998 | Young | 395/844 |

Primary Examiner—Christopher B. Shin
Attorney, Agent, or Firm—Fitzpatrick, Cella, Harper & Scinto

[57] ABSTRACT

A direct memory access controller (DMAC) comprises a chain DMA mode (which does not require a predetermined software process) and a normal DMA mode (which requires a predetermined software process). When a communication apparatus is in a normal-reception state, data is received utilizing the chain DMA mode and when the apparatus is in a reception-busy state, data is received utilizing the normal DMA mode. By virtue of this feature, in a normal data reception, a memory designated as a DMA transfer destination is switched without delay which will be caused by a software process, thereby preventing overflows of received data due to overhead required by a CPU.

6 Claims, 8 Drawing Sheets

DATA RECEPTION (DMA) COMPLETED AT BUFFER 1

DURING DATA RECEPTION (DMA) AT BUFFER 1

DATA RECEPTION (DMA) COMPLETED AT BUFFER 1

DURING DATA RECEPTION (DMA) AT BUFFER 2

5,850,570

COMMUNICATION APPARATUS FOR PERFORMING DATA TRANSFER UTILIZING DIRECT MEMORY ACCESS CONTROLLER

BACKGROUND OF THE INVENTION

The present invention relates to a communication apparatus for performing data transfer utilizing a direct memory access controller (DMAC).

Conventionally, when data is received in a communication apparatus, data transfer utilizing a so-called DMAC (Direct Memory Access Controller) is performed in which data is transmitted without being processed by a central processing unit (CPU). In this case, data reception is realized by re-setting a DMA transfer destination by software upon an interruption request from hardware at every data reception. In this process, there is a certain difference in time, from the time at which the hardware sends completion of interruption request indicative of data-reception to the time when the control is transferred to a software where the DMA transfer destination is re-set.

However, in accordance with recent improvements on the functions of communication apparatuses, the load on a CPU tends to increase. Therefore, in the foregoing conventional communication apparatus, a timing after the hardware sends an interruption request indicative of data reception completion until the control is transferred to a software for re-setting a DMA transfer destination, will be delayed longer than a normal delay time.

Also, in a communication utilizing HDLC (High-Level Data Link Control) frames such as an ECM communication in a G4 facsimile communication or a G3 facsimile communication, data is sometimes transmitted in extremely short frame intervals. In such case, received data may overflow due to the fact that timing of re-setting a DMA transfer destination lags behind that of receiving next data. Therefore, in the communication apparatus such as a facsimile apparatus, data is re-transmitted according to a communication protocol in order to recover the data, causing a longer communication time due to the recovery process.

SUMMARY OF THE INVENTION

The present invention has been made in consideration of the above situation, and has as its object to improve a communication apparatus.

An object of the present invention is to provide a communication apparatus which reduces time required for a communication by not performing data re-transmission for data recovery when a receiving apparatus is busy.

In order to achieve the foregoing objects, the present invention suggests a communication apparatus for performing data transfer utilizing a direct memory access controller (DMAC) comprising, means for setting a first transfer mode in which a memory associated with data transfer utilizing the DMAC is switched to a memory designated as a next transfer destination, without performing predetermined software process, means for setting a second transfer mode in which a memory associated with data transfer utilizing the DMAC is switched to a memory designated as a next transfer destination, by performing a predetermined software process, judging means for judging whether the communication apparatus is in a normal-reception state or a reception-busy state, and controlling means for controlling data transfer such that if it is judged by said judging means that the communication apparatus is in the normal-reception state, data transfer is performed by the first transfer mode, and if the communication apparatus is in the reception-busy state, data transfer is performed in the second transfer mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

Preferred embodiment of the present invention will be described in detail in accordance with the accompanying drawings. Note that in the following embodiment, descriptions are given for a facsimile apparatus as an example of a communication apparatus.

Figure 1:
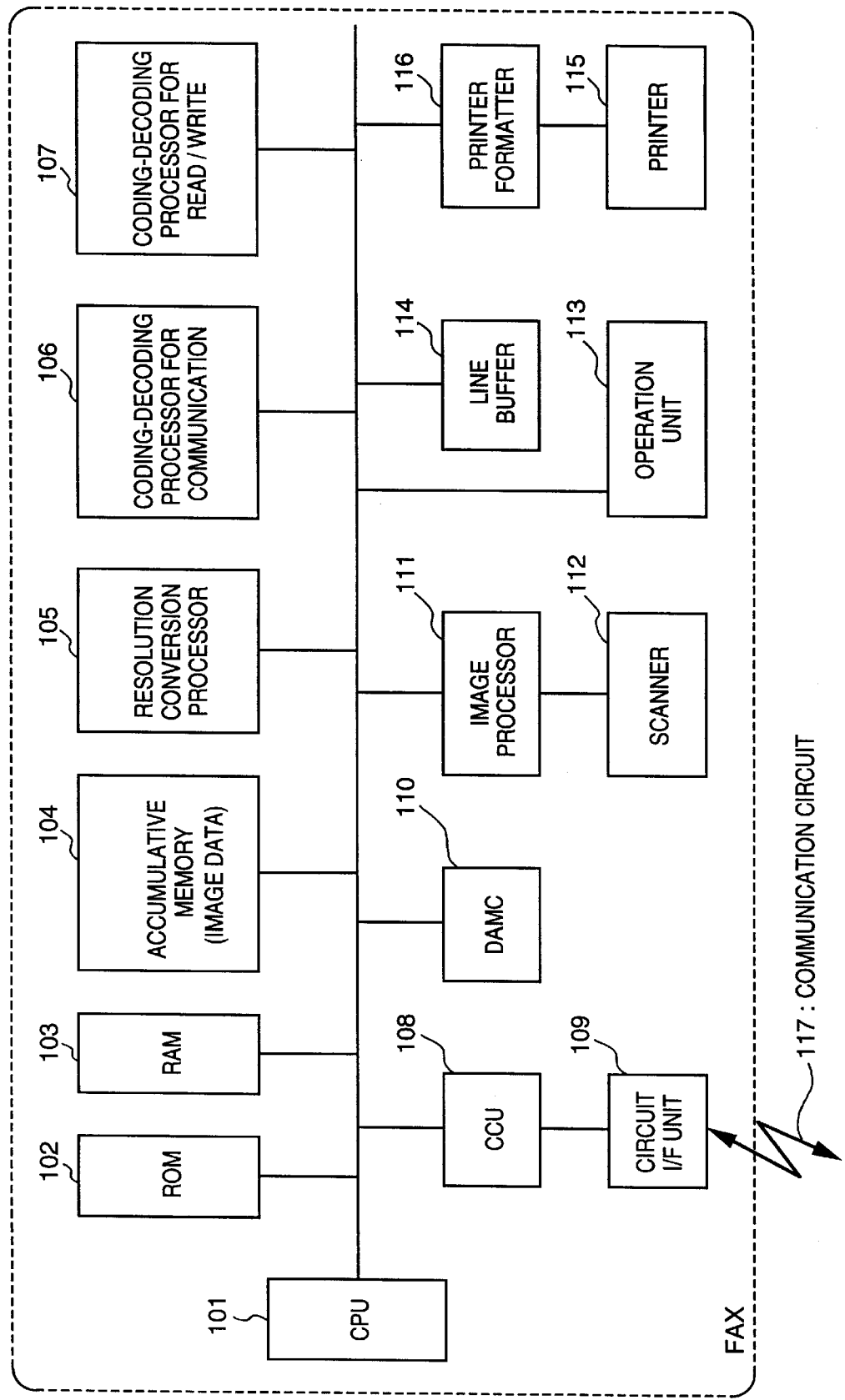
FIG. 1 is a block diagram illustrating a general structure of a facsimile apparatus according to an embodiment of the present invention.

FIG. 1 is a block diagram illustrating a general structure of a facsimile apparatus according to the embodiment of the present invention. In FIG. 1, a CPU 101 is a system control unit for controlling the entire apparatus, a ROM 102 stores a control program for the CPU 101, and a RAM 103 is structured with, for instance, SRAM or the like and stores program control variances. The RAM 103 also stores set values registered by an operator of the apparatus and control data of the apparatus. Furthermore, the RAM 103 serves as various working buffers. An image memory 104 is structured with a DRAM or the like and stores up image data. A resolution conversion processor 105 performs resolution conversion such as millimeter-to-inch resolution conversion of raster data. A coding-decoding processor for communication (communication CODEC) 106 and a coding-decoding processor for reading and writing (read/write CODEC) 107 perform coding and decoding processes for image data dealt by the facsimile apparatus. A communication control unit (CCU) 108 controls a communication protocol for a facsimile. A circuit i/f unit 109 provides an interface for a communication circuit 117 such as a line from an ISDN (Integrated Services Digital Network), and controls data transmitted to the circuit 117.

A DMAC 110 is a direct memory access controller which directly transfers data between memories or between a communication line and a memory, without being processed by the CPU 101. A scanner 112, which is structured with e.g. a CS image sensor, a document carrying mechanism or the like, optically reads an original image and converts the image into electrical image data. Then, a correction process is performed on the converted image data by an image processor 111 and image data having high definition is outputted.

An operation unit 113 composed of e.g. an LCD, a keyboard or the like is utilized for displaying various messages, and for inputting various instructions by an operator. A line buffer 114 is a buffer for controlling image data transfer. A printer 115 is an LBP (laser beam printer) which records a received image or file data on a recording sheet. A printer formatter 116 analyzes the printer description language and converts it to image data when, for instance, file data from a workstation (not shown) is printed.

A detailed process utilizing the DMAC in the facsimile apparatus according to the present embodiment will be described below.

Figure 2:
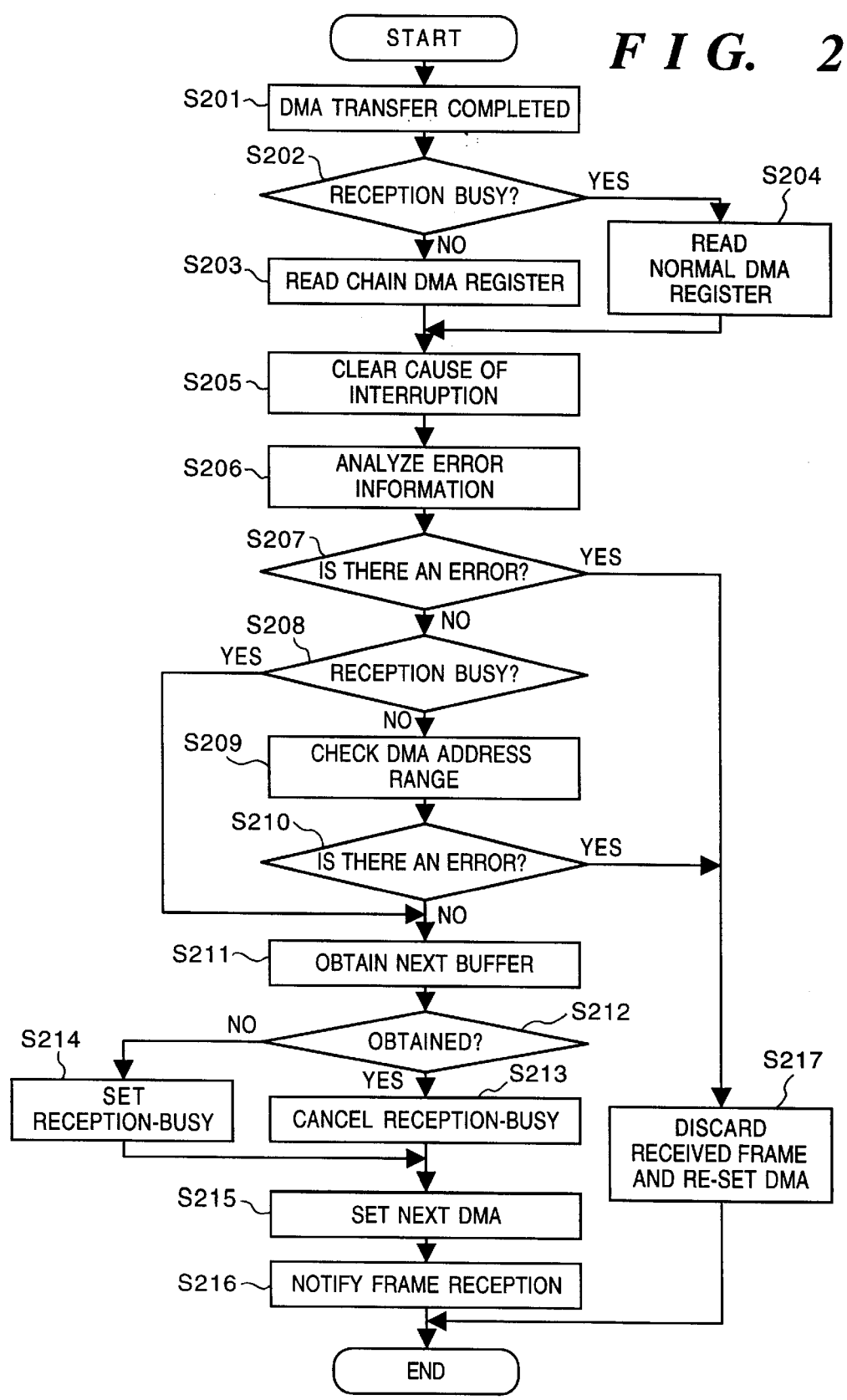
FIG. 2 is a flowchart showing a receiving process in a facsimile apparatus according to the present embodiments.
Figure 3:
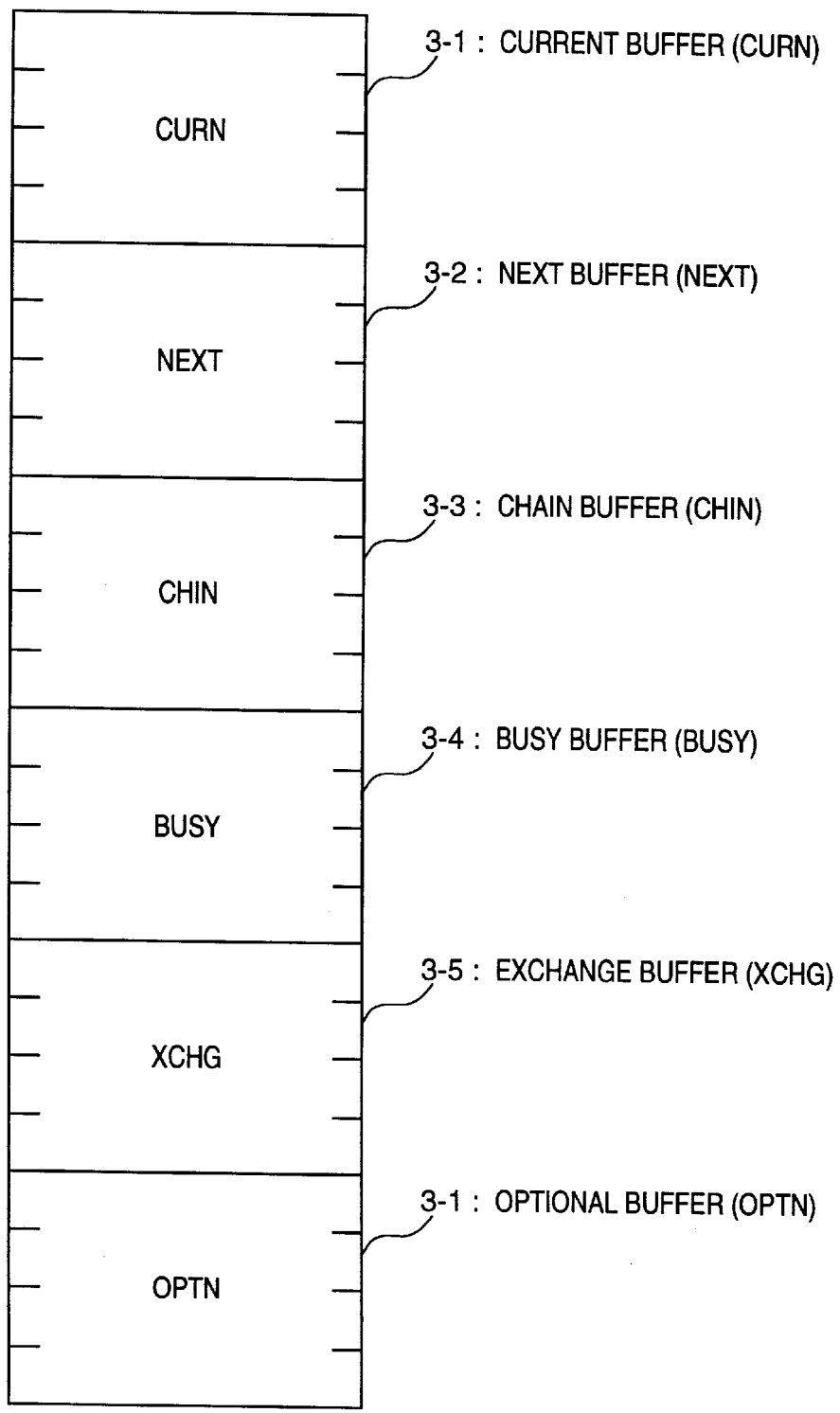
FIG. 3 is a diagram illustrating a management structure of reception buffers according to the present embodiment.

FIG. 2 is a flowchart illustrating a receiving process in the facsimile apparatus according to the present embodiment; and FIG. 3, a diagram illustrating a management structure of a reception buffer according to the present embodiment.

In the facsimile apparatus according to the present embodiment, of the six buffers, four buffers except an exchange buffer and an optional buffer shown in FIG. 3 are assigned prior to data reception, in order to manage a reception-buffer-control area for preparation for a reception buffer. In FIG. 3, a current buffer (CURN) 3—1 is a buffer currently set for the DMA and a next buffer (NEXT) 3—2 is a buffer to be used (chained) for the next DMA.

A chain buffer (CHIN) 3—3 is a buffer to be set (chained) for the DMA after the above-described next buffer 3—2, and a busy buffer (BUSY) 3—4 is a buffer utilized as a current buffer when a reception-busy state occurs. An exchange buffer (XCHG) 3—5 is an emergency buffer (hereinafter referred to as an extra buffer) whose buffer length is set shorter than a normal reception buffer, to be utilized as a buffer to which contents of the current buffer are transferred in case of the reception-busy state.

An optional buffer (OPTN) 3—6 is a buffer utilized when the reception-busy state is released. When the apparatus includes the optional buffer 3—6, the optional buffer is shifted to be used as a current buffer instead of obtaining another reception buffer when the reception-busy state is released.

Figure 4:
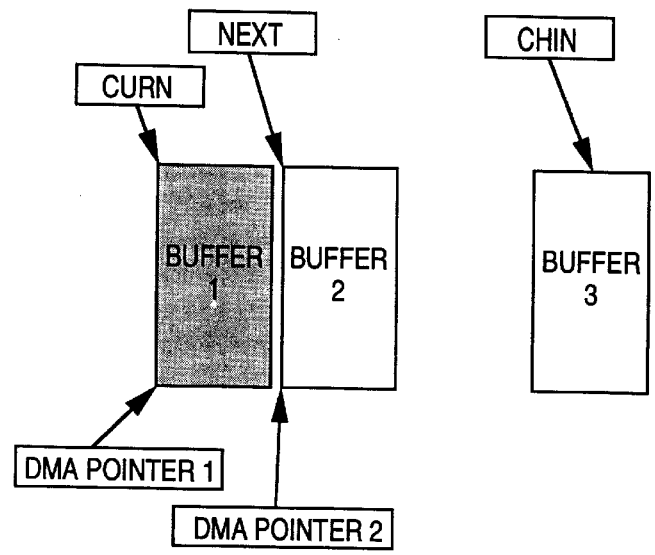
FIGS. 4 and 5 are schematic views of DMA chains according to the present embodiment.
Figure 5:
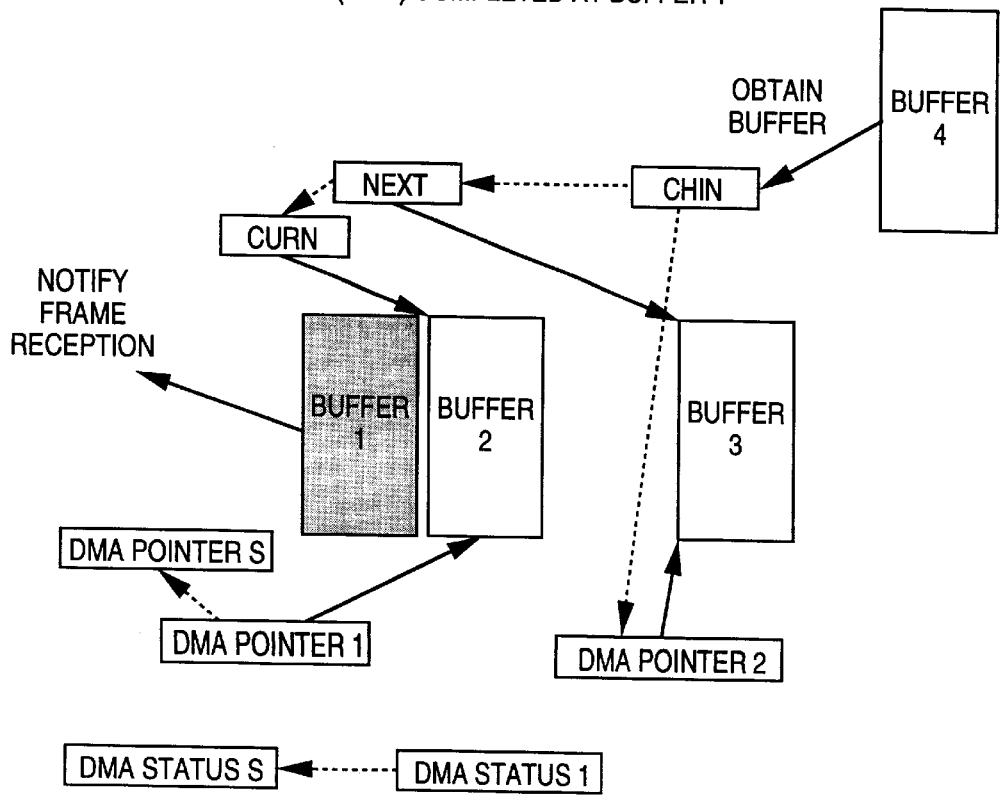
Figure 6:
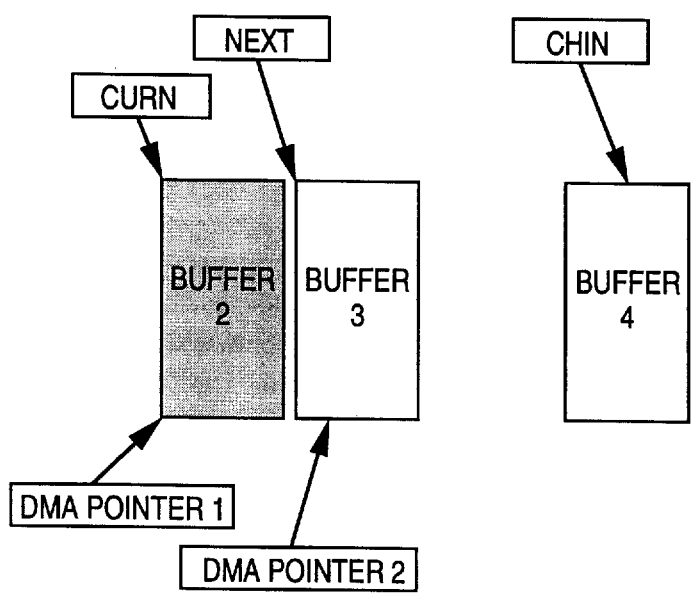
FIG. 6 is a schematic view of DMA chains.

FIGS. 4–6 showing a schematic view of DMA chains according to the present embodiment, illustrate flow of data between buffers where a receiving DMA is chained thereto. FIGS. 8–12 illustrate a register for executing each setting of the receiving DMA and each state observation.

As shown in FIGS. 4–6, 8 and 9, a DMA pointer 1 is a register which stores an address of a reception buffer at which the DMAC 110 in FIG. 1 is currently performing a DMA, and a DMA pointer 2 is a register which stores an address of a reception buffer to which the DMA is to be chained when the DMA at the reception buffer pointed by the DMA pointer 1 is completed.

FIG. 4 shows flow of data during the data reception at a buffer 1. Herein, a buffer 1 is included in the current buffer, a buffer 2 in the next buffer, and a buffer 3 in the chain buffer.

FIG. 5 shows flow of data after completion of the DMA at the buffer 1. Herein, by automatically reading an address of the buffer 2 by hardware, contents of a DMA status 1 are stored in a DMA status S, those of the DMA pointer 1 in a DMA pointer S and those of the DMA pointer 2 in the DMA pointer 1.

Figure 10:
Figure 11:
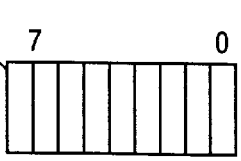
Figure 12:
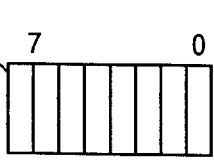

To explain these registers further by referring to FIGS. 10–12, the contents of the DMA pointer 1 is stored in the DMA pointer S when the DMA transfer at a buffer (a memory) pointed by the DMA pointer 1 is completed. The DMA status 1 is a register which shows a status of data when the DMAC is currently performing a DMA transfer. The DMA status S is a register which stores the contents of the DMA status 1 when the DMA transfer at a buffer (a memory) pointed by the DMA pointer 1 is completed.

Figure 13:
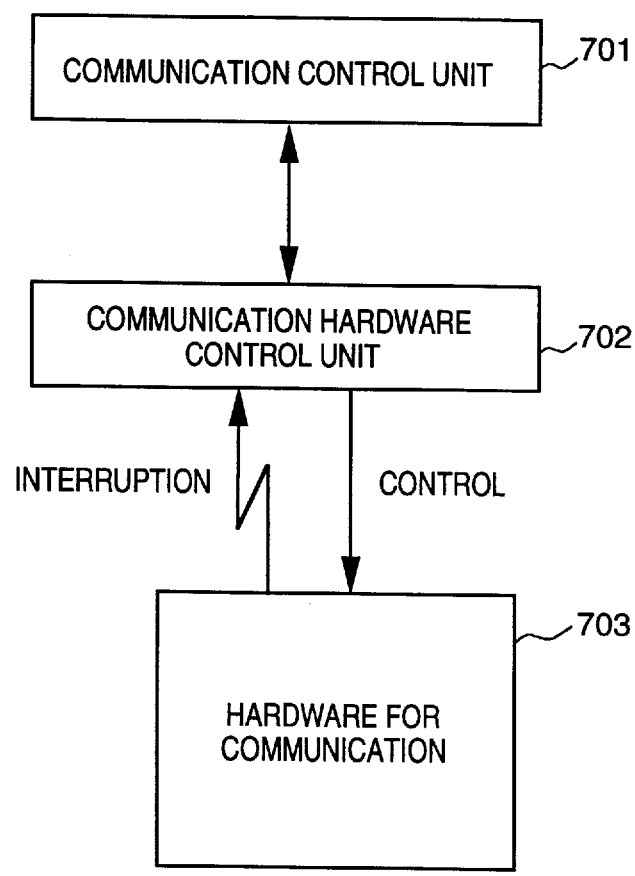

FIG. 13 is a block diagram showing a structure of the communication control unit (CCU) in the facsimile apparatus according to the present embodiment. As shown in FIG. 5, a reception buffer stored in the current buffer is notified as received data to a communication control unit 701, by a communication hardware control unit 702 shown in FIG. 13, and a reception buffer stored in the next buffer is shifted to the current buffer.

Further, a reception buffer stored in the chain buffer is shifted to the next buffer, and set to the DMA pointer 2 as a buffer for the next DMA chain. When data reception in a reception buffer is completed, another reception buffer is obtained and stored in the chain buffer.

FIG. 6 shows flow of data during the data reception at the buffer 2. While the buffer 2 is receiving data, the buffer 2 is stored in the current buffer, the buffer 3 in the next buffer, and the buffer 4 in the chain buffer.

Next, a process after completion of data reception at a reception buffer in the present embodiment will be described in detail by referring to FIG. 2.

When a DMA transfer is completed (interruption request is generated) in step S201 in FIG. 2, whether or not a current reception state of a terminal is busy is judged (such as a state where no reception buffer is available) in step S202.

As a result of the judgment in step S202, if the terminal is in a reception-busy state, contents of normal DMA registers which, in this case, are DMA pointer 1 and DMA status 1, are read in step S204 in order to obtain the result of the received data, since the data is received in a normal DMA mode. This is a transfer mode in which a memory designated as a data transfer destination of the DMAC is switched to a memory designated as a next transfer destination through a software process.

However, if it is judged in step S202 that the terminal is not in a reception-busy state, a DMA register for chaining is read in step S203 in order to obtain the result of the received data, since the data is received in a chain DMA mode. This is a transfer mode where a memory designated as a data transfer destination of the DMAC is switched to a memory designated as a next transfer destination without being software processed.

After the received data is obtained from hardware in step S203 or step S204, a cause of interruption which has given rise to completion of data reception is cleared in step S205, in order to prepare for a next data reception. Then, in step S206, the result of the received data such as a received data length, a state of the received data or the like, obtained from the hardware in step S203 or step S204, is analyzed. Then whether or not there is an error in the received data is determined in step S207 based upon the analyzing result obtained in step S206.

If it is determined that there is an error in the received data in step S207, the received data (received frame) is discarded in step S217, and re-setting of the DMA takes place. As the re-setting, the current buffer (CURN) is set to the DMA pointer 1 and the next buffer (NEXT) is set to the DMA pointer 2 in order to continue data reception. Note that a recovery process of the discarded data is left to be determined by the communication control unit (CCU) 701.

Meanwhile, if it is judged in step S207 that there is no error in the received data, whether or not a current reception state of the terminal is in a reception-busy state is determined in step S208. This state is similar to the foregoing state where a buffer for a reception is unobtainable.

If it is determined in step S208 that the terminal is not in a reception-busy state, a reception buffer address which is the received data obtained in the foregoing step S203 is compared in step S209 with a reception buffer address managed in the current buffer (CURN).

In accordance with the comparison, since the chain DMA mode is utilized as described above, it is checked whether or not execution of the process for completing the data-reception is somehow delayed and whether the DMA is chained to a next reception buffer. In other words, in this step, a range of the reception buffer address indicative of the received data obtained in step S203 is checked. Then in the following step S210, it is determined based upon the checked result whether or not there is an error.

If it is judged in step S210 that there is an error, the received data is discarded in step S217, similar to the error processing in step S207, then the data reception is continued by re-setting the current buffer (CURN) to the DMA point 1 and the next buffer (NEXT) to the DMA pointer 2.

However, if the result of the determination in step S208 shows a reception-busy state, or if it is determined in step S210 that there is no error, the process proceeds to step S211. In step S211, the next reception buffer is obtained, and in the following step S212, whether or not the reception buffer has been successfully obtained is determined.

If it is determined in step S212 that the reception buffer has not been successfully obtained, the reception state of the terminal is set to a reception-busy state in step S214. If the result of the determination in step S212 shows that the reception buffer has been successfully obtained, the reception state of the terminal is set to a reception-busy-canceled state in step S213.

In the next step S215, if the terminal is in the chain DMA mode, the chain buffer (CHIN) is set to the DMA pointer 2 and if it is in the normal DMA mode, the current buffer is set to the DMA pointer 1, so as to execute re-setting of the DMAC 110. Then, the received data is notified to the communication control unit 701 in step S216.

Figure 7:
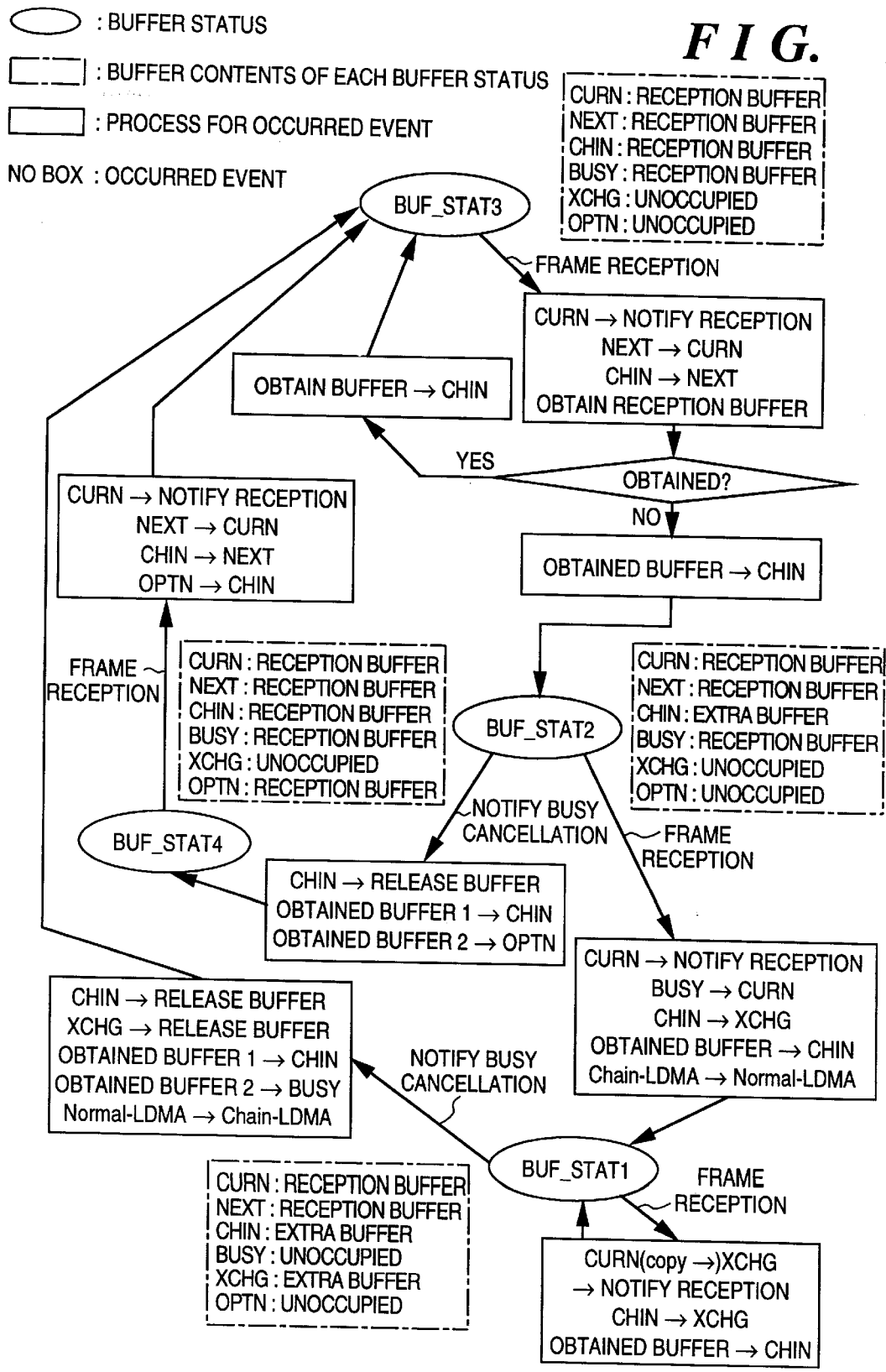
FIG. 7 is a diagram illustrating controlled states of the reception buffers.
Figure 8:
FIGS. 8–12 are diagrams showing a register for executing each setting of receiving DMA and each observation state; and FIG . 13 is a block diagram showing a structure of a communication control unit (CCU).
Figure 9:

FIG. 7 is a diagram showing controlled states of the reception buffer according to the present embodiment. In FIG. 7, each status (buffer status) is shown as enclosed by an oval. Among these states, "BUF_STAT1" represents a state where a reception-buffer-busy state has occurred and the state is continuing; "BUF_STAT2" represents a state immediately after the occurrence of the reception-buffer-busy state; "BUF_STAT3" represents a normal state where no reception-buffer-busy state takes place; and "BUF_STAT4" shows a state where the reception-buffer-busy state is canceled and one unoccupied reception buffer is available.

Buffer contents of each buffer status is shown in boxes with dotted lines and processes to be performed for various events are shown in boxes with solid lines. Note that descriptions not in any box in FIG. 7 are occurred events.

As described above, according to the present embodiment, in a case where data is received utilizing the DMAC which executes transfer of data in a memory without being processed by a CPU, the DMAC is configured to have a chain DMA mode and a normal DMA mode, in a case where the terminal is in a normal-reception state, data is received utilizing the chain DMA mode, and in a case where the terminal is in a reception-busy state, the normal DMA mode is utilized. Accordingly, in the normal data reception, a change over of the memory designated as a destination of a DMA transfer can be performed without delay which will be caused by software process, thereby preventing overflows of received data due to overhead required by the CPU. Further, a software process for performing a normal DMA transfer can be simplified at the time of the reception-busy state, thereby reducing a communication time since data re-transmission according to a communication protocol for data recovery is not necessary.

Note in the foregoing embodiment, explanations are given only on a facsimile apparatus as a communication apparatus; however, the present invention can be applied to other terminal apparatuses which perform data reception utilizing a DMA.

The present invention can be applied to a system constituted by a plurality of devices, or to an apparatus comprising a single device.

As set forth above, data reception by changing over the chain DMA transfer mode and the normal DMA transfer mode in accordance with a state of the apparatus, can realize simplification of a software process. Furthermore, communication time can be reduced by not performing data re-transmission according to a communication protocol for data recovery.

The present invention is not limited to the above embodiment and various changes and modifications can be made within the spirit and scope of the present invention. Therefore, to appraise the public of the scope of the present invention, the following claims are made.

What is claimed is:

1. A communication apparatus for performing data transfer utilizing a direct memory access controller (DMAC), comprising:

means for setting a first transfer mode in which a memory associated with data transfer utilizing said DMAC is switched to a memory designated as a next transfer destination, without performing a predetermined software process;

means for setting a second transfer mode in which a memory associated with data transfer utilizing said DMAC is switched to a memory designated as a next transfer destination, by performing a predetermined software process;

judging means for judging whether the communication apparatus is in a normal-reception state or a reception-busy state; and controlling means for controlling data transfer such that if it is judged by said judging means that the communication apparatus is in said normal-reception state, data transfer is performed in said first transfer mode, and if the communication apparatus is in said reception-busy state, data transfer is performed in said second transfer mode.

2. The apparatus according to claim 1, further comprising:

detecting means for detecting whether or not there is an error in received data;

means for discarding said received data when said detecting means detects the error;

re-setting means for re-setting said DMAC when said detecting means detects the error.

3. The apparatus according to claim 1, wherein said reception-busy state includes a state where a buffer for data reception is not available.

4. A communication method of transferring received data utilizing a DMAC, having a first transfer mode in which a memory associated with data transfer utilizing a DMAC is switched to a memory designated as a next transfer destination, without performing a predetermined software process, and a second transfer mode in which a memory associated with data transfer utilizing the DMAC is switched to a memory designated as a next transfer destination, by performing the predetermined software process, comprising the step of:

judging whether or not data reception process is in a busy-state, performing data transfer in said first transfer mode, if said reception process is not in a busy-state; and performing data transfer in said second transfer mode, if said reception process is in a busy-state.

5. The method according to claim 4, further comprising the steps of:

detecting whether or not there is an error in received data; and discarding said received data and re-setting said DMAC if the error is detected in said detecting step.

6. The method according to claim 4, wherein said busy state includes a state where a buffer for data reception is not available.

* * * * *